(12) United States Patent
Lim et al.

(10) Patent No.: US 12,534,264 B2
(45) Date of Patent: Jan. 27, 2026

(54) HEALTHY AND ECO-FRIENDLY PAPER CONTAINER INCLUDING ALUMINUM LINER AND METHOD FOR PRODUCING SAME

(71) Applicant: Byung Yun Lim, Cheongju-si (KR)

(72) Inventors: Byung Yun Lim, Cheongju-si (KR); Yang Gyu Lim, Cheongju-si (KR); Soo Hyun Lim, Cheongju-si (KR)

(*) Notice: Subject to any disclaimer, the term of this patent is extended or adjusted under 35 U.S.C. 154(b) by 435 days.

(21) Appl. No.: 17/292,016

(22) PCT Filed: Nov. 8, 2019

(86) PCT No.: PCT/KR2019/015183
§ 371 (c)(1),
(2) Date: May 7, 2021

(87) PCT Pub. No.: WO2020/096418
PCT Pub. Date: May 14, 2020

(65) Prior Publication Data
US 2022/0073231 A1      Mar. 10, 2022

(30) Foreign Application Priority Data

Nov. 9, 2018   (KR) .................. 10-2018-0138029
Sep. 19, 2019  (KR) .................. 10-2019-0115594
Nov. 8, 2019   (KR) .................. 10-2019-0142663

(51) Int. Cl.
*B65D 3/22*        (2006.01)
*B32B 1/00*        (2024.01)
(Continued)

(52) U.S. Cl.
CPC .................. *B65D 3/22* (2013.01); *B32B 1/00* (2013.01); *B32B 7/12* (2013.01); *B32B 15/12* (2013.01);
(Continued)

(58) Field of Classification Search
CPC . B65D 3/22; B65D 3/06; B65D 5/563; B65D 65/466; B65D 3/14; B65D 3/12;
(Continued)

(56) References Cited

U.S. PATENT DOCUMENTS 4,720,037 A * 1/1988 Alpert .................... B65D 85/78
                                                    426/135
6,308,883 B1 * 10/2001 Schmelzer ................ B32B 5/18
                                                    428/36.5
(Continued)

FOREIGN PATENT DOCUMENTS

JP    2012091808 A  *  5/2012
JP    2016-204047 A    12/2016
(Continued)

OTHER PUBLICATIONS

International Search Report for PCT/KR2019/015183 issued Mar. 5, 2020.
(Continued)

*Primary Examiner* — Christopher R Demeree
(74) *Attorney, Agent, or Firm* — Schmeiser, Olsen & Watts LLP

(57) ABSTRACT

A paper container including an aluminum liner, which protects people's health from environmental hormones in a paper container is provided. Also provided is an eco-friendly paper container wherein, in the case of using a water-based adhesive, paper can be easily separated from the container by immersing the container in water, to allow easy paper recycling. The paper container conserves forests and thus can contribute to the prevention of climate change. Further, the container is a disposable or multiple-use food container that can be used for various foods and beverages such as (Continued)

coffee, beer, beverages, cup noodles, cup rice, soup, and stew. The container helps human health and global environmental conservation.

2 Claims, 11 Drawing Sheets

(51) Int. Cl.
| | |
|---|---|
| B32B 7/12 | (2006.01) |
| B32B 15/12 | (2006.01) |
| B32B 15/20 | (2006.01) |
| B32B 27/10 | (2006.01) |
| B32B 37/12 | (2006.01) |
| B65D 3/06 | (2006.01) |
| B65D 5/56 | (2006.01) |
| B65D 65/46 | (2006.01) |

(52) U.S. Cl.
CPC ............. *B32B 15/20* (2013.01); *B32B 27/10* (2013.01); *B32B 37/1284* (2013.01); *B65D 3/06* (2013.01); *B65D 5/563* (2013.01); *B65D 65/466* (2013.01); *B32B 2311/24* (2013.01); *B32B 2317/12* (2013.01); *B32B 2439/02* (2013.01)

(58) Field of Classification Search
CPC ......... B65D 81/3865; B32B 1/02; B32B 7/12; B32B 15/12; B32B 15/20; B32B 27/10; B32B 37/1284; B32B 2311/24; B32B 2317/12; B32B 2439/02; B32B 23/06; B32B 2255/12; B32B 9/06
USPC .... 229/400, 198.2, 4.5, 403, 5.5; 220/62.12; 428/195.1, 414, 418
See application file for complete search history.

(56) References Cited

U.S. PATENT DOCUMENTS

| | | | |
|---|---|---|---|
| 8,113,416 B2* | 2/2012 | Yan | B31B 50/64 |
| | | | 229/4.5 |
| 8,956,497 B2* | 2/2015 | Beyers | C08G 18/4238 |
| | | | 156/331.7 |
| 9,114,900 B2* | 8/2015 | Hougland | B65D 3/14 |
| 10,589,890 B2* | 3/2020 | Nille | B65D 3/14 |
| 11,434,042 B2* | 9/2022 | Leeds | B65D 3/06 |
| 2003/0141308 A1 | 7/2003 | Barniak, Jr. | |
| 2013/0149453 A1* | 6/2013 | Romick | C09D 123/06 |
| | | | 524/504 |
| 2015/0082747 A1* | 3/2015 | Honda | C08L 63/00 |
| | | | 564/123 |

FOREIGN PATENT DOCUMENTS

| | | |
|---|---|---|
| KR | 10-1998-0072028 | 10/1998 |
| KR | 10-1998-0072099 | 10/1998 |
| KR | 2019980065224 | 11/1998 |
| KR | 10-0607404 B1 | 7/2006 |
| KR | 10-1466224 B1 | 11/2014 |
| KR | 10-1616852 B1 | 5/2016 |
| KR | 20-2016-0003042 | 9/2016 |
| KR | 20-2018-0000285 U | 1/2018 |
| KR | 10-2018-0071071 A | 6/2018 |

OTHER PUBLICATIONS

Source: "Food Packaging", p69, Bak Mu-Hyeon et al. Hyeongseol Publishing House.
DeMerlis, CC—Review of the oral toxicity of polyvinyl alcohol (PVA)—Academic Journal Food and Chemical Toxicology 2003, vol. 41, No. 3 319p-326p ISSN 0278-6915.

* cited by examiner

Food bowl        Beverage cup

HEALTHY AND ECO-FRIENDLY PAPER CONTAINER INCLUDING ALUMINUM LINER AND METHOD FOR PRODUCING SAME

CROSS-REFERENCE TO RELATED APPLICATIONS

This application claims priority to PCT Application No. PCT/KR2019/015183, having a filing date of Nov. 8, 2019, based on KR 10-2019-0142663, having a filing date of Nov. 8, 2019 and KR 10-2019-0115594, having a filing date of Sep. 19, 2019 and KR 10-2018-0138029, having a filing date of Nov. 9, 2018, the entire contents all of which are hereby incorporated by reference.

FIELD OF TECHNOLOGY

This following is related to the aluminum lining paper cups and paper cartons. This is to bond aluminum foil to the inner surface of a paper container to protect human health from endocrine disrupters and carcinogens leaching from synthetic resins. These containers facilitate the recycling and the re-use of paper. This is applied to disposable food containers, including disposable cups for coffee or beverage, disposable containers for instant noodles, food packing containers, paper cups, paper cartons (including for milk, beverages, or liquor), and food packed in the containers above.

BACKGROUND

There have been no paper containers, which can be re-used and recyclable, and are safe for human health up to now. The existing paper containers are harmful to human health and the environment. As synthetic resins, including polyethylene(PE), Polypropylene(PP), or nylon(NY), are used to line the inner surface of existing paper containers, the hot food contained in those containers can induce the release of carcinogens and endocrine disrupters (environmental hormones). Furthermore, it is difficult to reuse or recycle the resources as synthetic resins adhere to the paper. For recycling, the paper needs to be easily separated from those synthetic resins. However, there is no such product on the market.

The joints between aluminum surfaces could not be sealed in aluminum lining containers, and the adhesion power between aluminum and synthetic resins including PE, PP, and PS (polystyrene) is very weak. Accordingly, it has been impossible to make aluminum lining containers. PE is slightly adhesive, but it is not sufficient for shaping & bonding it.

Biodegradable plastics, which are known to be eco-friendly, are produced by mixing biodegradable substances, including starch, with synthetic resins. While starch is decomposed at land-fill, the plastic elements are not decomposed and escape into the ecosystem as microplastics (hydrosphere, animal, vegetable, and soil system). Thus, biodegradable plastics are harmful to nature and organisms. Those plastics are neither health-friendly nor eco-friendly.

Moreover, even paper cups made with PLA (Poly Lactic Acid) using corn starch, which is conceived to be eco-friendly, contain about 12 kinds of chemicals, so they are also harmful to health. Chemicals are leached from PLA cups by themselves. While the corn starch is decomposed, the chemicals are decomposed into micro-substances, which can flow into ecosystems. So, they are harmful to the environment and health.

Health and environmental issues related to disposable food containers (paper cups and cartons) are chronic challenges which humans could not solve for a long time.

SUMMARY

Existing paper containers (including paper cups and cartons) have been used for a variety of food, including coffee, instant noodle, fresh noodles or rice, milk, beverages, liquor, food, soup, or stew, and have the following problems:
1. There are no safe paper containers for human health. More carcinogens and endocrine disrupters are leached out from synthetic resins, including PP and PE, inside paper containers as food inside is hotter
2. When food is stored in a synthetic resin-lining container, the synthetic resin melts into the food, making the taste of the food changed. Moreover, Penetrating air into the container makes it difficult to keep food fresh for a long time.
3. It's difficult to recycle the paper because synthetic resins are bonded to the outer layer (paper).
4. The joints between surfaces of aluminum foils in the aluminum lining paper cup are not sealed.
5. It's difficult to make an aluminum lining container because synthetic resins such as PE, PP, PS don't have strong adhesion power to bond with aluminum in existing food containers. PE has slightly better adhesive, but not enough to maintain a strong bond to aluminum.
6. Existing paper containers are disposed of after single use only.
7. if a synthetic resin layer is made over the outer surface of the paper, manufacturing cost rises. Moreover, it is difficult to recycle paper.
8. Synthetic resins do not decompose when land-filled.
9. Even PLA (Poly Lactic Acid), made with corn starch, contains about 12 kinds of chemical substances. Thus, there are no true eco-friendly and health-friendly containers.
10. Synthetic resins are largely used in food containers.

For addressing the concerns above, the aluminum lining paper container in embodiments of the invention, which is eco-friendly, health-friendly, and easy to recycle, uses aluminum foil as an inner lining and paper or synthetic resins for an outer layer. The outer layer can be made out of multiple materials including paper. Paper containers include paper cups and paper cartons.

The aluminum lining paper cup is composed of the side paper (side part, side sheet) and the bottom paper (bottom sheet, bottom plate, bottom) and may have a lid on the top.

The paper carton is mainly made in all-in-one type and can be composed of side part, bottom, and top, and sometimes have a separable top. The side part can be assembled with the top and the bottom. The lid is mainly put on the top.

In another embodiment of this paper cup invention, the side part of the cup consists of aluminum lining on the inner part and the outer part consists of a paper layer including paper. The exterior of an outer layer of paper can be exposed to the atmosphere or synthetic resins containing polar substances or other synthetic resins can cover the outer surface of the paper layer. Jointing the side part to the bottom, jointing to each side part roundly, and bonding the aluminum foil lining on the paper in layer require at least one or more adhesives among water-soluble adhesives, synthetic resins, and synthetic resin containing polar substances.

For shaping and bonding the side part and the bottom or joining each side part roundly, it is recommended to use water-soluble adhesives or synthetic resins containing polar substances.

For the melting point or decomposition point of the adhesives above, temperatures above the service temperature of the container are acceptable. However, temperatures 100° C. or more are recommended for general use. It is highly recommended that softening temperature is 100° C. or more.

For sealing the joints of aluminum foils contacting points, when shaping and bonding the side part and the bottom, at least one or more of the adhesives among synthetic resins, water-soluble adhesives, and synthetic resins containing polar substances are needed to be applied to the bottom jointing area (30) as shown in FIG. 9.

The other embodiment of this invention is the aluminum foil lining paper cup with aluminum foil inside. For at least one or more parts in the aluminum lining surface (20) or bottom part (30) in the side part (side paper)) of the container above, its melting point or decomposition point shall be 100° C. or more. When the softening point is 100° C. or more, it is more desirable; at least one of the water-soluble adhesive, synthetic resin or synthetic resins containing polar substances shall be applied, in whole or partial, to the side part (20) or bottom part (30) of the side paper in the joining surface when shaping and bonding the container. It is more desirable to use water-soluble adhesives or synthetic resins containing polar substances when shaping and bonding the side paper and the bottom or jointing the side papers.

Another embodiment of this invention is an aluminum lining paper container, using aluminum foil (1) for the inner lining, and paper or synthetic resins for the outer layer. In the field of paper container that has a side part and the bottom, or has a side part, a top, and a bottom; When shaping the side paper, shaping and bonding the side paper and the bottom, or shaping and bonding the side paper and the top; at least one of the adhesive applied for these shall be water-soluble or a synthetic resin containing polar substances.

The generally rectangular paper carton is made by folding and jointing the flat paper material. In the flat paper carton before being folded, the aluminum foil layer can be applied to the entire surface inside, or only to the inner surface, except jointing parts at the top and bottom of the paper carton to which synthetic resin is exposed to. For jointing side parts of paper carton lined with aluminum lining in whole or partial, apply synthetic resins or synthetic resins containing polar substances to the area rectangularly shaped and bonded. It is more desirable to use synthetic resins containing polar substances.

Shaping and bonding the top and bottom of the paper carton use synthetic resins or synthetic resins containing polar substances. When even one side is made of aluminum foil, it is more desirable to use synthetic resins containing polar substances. The adhesives for the paper carton can be applied to the inner surface, outer surface, or both.

For the boning surfaces which do not directly contact hot substances, adhesives of which melting point or decomposition point is higher than the service temperature can be used.

In embodiments of the invention, above water-soluble adhesives may contain either one or more of polyvinyl alcohol (PVA) series, polyvinyl acetate (PVAc) series, ethylene-vinyl acetate (EVA) series, hydroxypropyl methylcellulose phthalate (HPMCP), gelatinized vegetable starch, dextrin, soluble starch, oxidized starch, glue, Casein, Arabic gum, paste, biodegradable adhesive resin, acrylic emulsion. or cellophane.

The above synthetic resins containing polar substances in the embodiments may include either one or more of epoxy resin series, polyamine series, acid anhydride series, polyamide series, resol resin series, polysulfide series, acrylic series, phenolic resin series, polyurethane series, silicon series, rubber series, polyamide-imide series, polyimide series, polybenzimidazole series, polyester series, polyvinyl acetate series, polyolefine series, nylon series, urea resin series, aniline resin series, toluene sulfonamide series, isocyanate alkyd series, cyanoacrylate series, polyphenyl ether series, polyvinyl acetate series, or melamine series.

The above polyamine series in the embodiments may include either one or more of diethyl triamine, triethylenetetramine, diethyl aminopropyl amine, xylene diamine, modified aliphatic polyamine, phenylenediamine, and amino diphenyl sulfone, and the acid anhydride may include either one or more of maleic acid anhydride, phthalic anhydride, or hexahydrophthalic acid anhydride.

The synthetic resins or synthetic resins containing polar substances above in the embodiments may include either one or more synthetic resins among the synthetic resins above based on polyolefine series, polyester series, nylon series, polystyrene series.

The above synthetic resins containing polar substances in the embodiments are a mixture of either one or more polar substances among HDPE, MDPE, LDPE, LLDPE, PP, polyester, nylon, PS, PET, biodegradable synthetic resins, PLA (Poly Lactic Acid), and biodegradable resins.

The above synthetic resins or synthetic resins containing polar substances in the embodiments may contain biodegradable resins.

The above water-soluble adhesives, synthetic resins, or synthetic resins containing polar substances in the embodiments can be used as a hot-melt adhesive.

The synthetic resins which can be applied to the outer surface of the outer paper layer above in the embodiments may contain polar adhesives or biodegradable resins.

One of the embodiments of the manufacturing method of paper cups with an aluminum foil lining provides the manufacturing method of aluminum lining paper cups, which are eco-friendly, health-friendly, easy to recycle, and are characterized by including the steps below, regardless of its order:

Step 1—Removing oil from the aluminum foil;

Step 2—Manufacturing the aluminum lining paper material by bonding rolled paper and rolled aluminum foil in the layer using water-soluble adhesives, synthetic resins, or synthetic resins containing polar substances of which melting point or decomposition point is 100° C. or more Step 3—Roll the side paper roundly which is made by tailoring aluminum lining paper material made in step 2 above, and bonding the side parts of aluminum lining paper cup using water-soluble adhesives or synthetic resins containing polar substances of which melting point or decomposition point is 100° C. or more;

Step 4—After tailoring the above aluminum lining paper material or special-made bottom paper or the material for the bottom paper, Shaping and bonding the paper cup by jointing the parts by applying water-soluble adhesives or synthetic resins containing polar substances of which melting point or decomposition point is 50° C. or more to the area between the side paper and the bottom.

The manufacturing method of the aluminum lining paper cups in the other embodiment includes fabricating the side part and bonding the side part with the bottom part above. Fabricating the side part includes bonding aluminum foil lining and the paper layer together using adhesives. In this case, synthetic resins can be applied to the exterior of the paper layer. When bonding the above aluminum lining to the above paper layer, the adhesives of which melting point or decomposition point is 100° C. or more shall be either one or more of water-soluble adhesives, synthetic resins, or synthetic resins containing polar substances. The adhesives used for shaping the side paper in a cylindrical shape or bonding and shaping the side part and the bottom part shall be one or more water-soluble adhesives or synthetic resins containing polar substances.

Paper carton may be made of an all-in-one type of Bottom, Side, and Top, or Side and Bottom only with top cover separately attached, and of course, Bottom can be separated as well.

One embodiment of the manufacturing method of paper cartons is described below.

Step 1—Bond aluminum foil lining using water-soluble adhesives, synthetic resins, or synthetic resins containing polar substances to the whole interior surface of the paper;

Step 2—Apply synthetic resins or synthetic resins containing polar substances to the jointing part of the top and the bottom (20) or the jointing area surface of the top part and the bottom part;

Step 3—Cut the aluminum lining paper to make the carton;

Step 4—Apply either one or both parts of the side connection part (30) of the paper carton with synthetic resins or synthetic resins containing polar substances, or to the outer area which is bonded to the side connection part;

Step 5—Attach the lid to a part of the paper carton if necessary;

Step 6—Shape and bond the paper carton;

Provide the manufacturing method of paper cartons including the steps above regardless its order.

Another embodiment of manufacturing a paper carton is described below:

Step 1—Apply synthetic resins or synthetic resins containing polar substances to the inner layer of the paper;

Step 2—Apply and bond the aluminum foil to the inner area of paper, except for the top and bottom joint part (20) using synthetic resins or synthetic resins containing polar substances;

Step 3—Tailor the paper carton;

Step 4—Apply either one or both parts of the side connection part (30) of the paper carton with synthetic resins or synthetic resins containing polar substances, or to the outer area which is bonded to the side connection part;

Step 5—Attach the lid to the part of the paper carton if necessary;

Step 6—Shape and bond the paper carton;

Provide the manufacturing method of paper cartons including the steps above regardless of the order.

The embodiments of the manufacturing methods of the above paper cartons are based on the all-in-one body type of top, side, and bottom, but can be applied to a single body type of Side and Bottom. However, In this case, the separately manufactured plastic top or metal top is bonded using synthetic resins or synthetic resins containing polar substances. Bonding may include a heating process.

The effects of embodiments of the invention are described below.

1. Embodiments of the invention prevent carcinogens and endocrine disrupters by embodying an aluminum lining paper container.
2. Embodiments of the invention embody the aluminum lining container, in which the joint of aluminum foil surfaces can be securely bonded using synthetic resins containing polar substances, and create an aluminum lined container with superior adhesive strength at the joints.
3. Embodiments of the invention exhibit the disposable food container which can be easily recycled by using water-soluble adhesives.
4. Embodiments of the invention helpto prevent food spoilage by blocking air passage and synthetic resins from leaching into the food product.
5. Embodiments of the invention creates elegant paper cups with metal gloss.
6. Owing to the metal lining inside the paper cup of this invention, it enables to use recycled paper and save production cost.
7. Embodiments of the invention provide paper cups that can be washed and reusable.
8. Embodiments of the invention contributes to reduce global warming and protect forests by using recycling paper.
9. Embodiments of the invention reduce plastic pollution by reducing the usage of synthetic resins.
10. Embodiments of the invention contribute to improving human health.
11. Embodiments of the invention contribute to the development of relevant industries and the economy.

BRIEF DESCRIPTION

Some of the embodiments will be described in detail, with reference to the following figures, wherein like designations denote like members, wherein:

FIG. 1 is the outline sectional drawing focusing on the side part of the aluminum lining paper cup. The lining is aluminum foil (1) and the outer layer is paper (4). The paper layer and aluminum foil are bonded using water-soluble adhesive (3). The outer surface of the paper can be arranged in a layer with a synthetic resin (polar substances or biodegradable resins can be contained). The outer synthetic resin layer may use foamed synthetic resins (synthetic resin containing gas).

Figure 1:
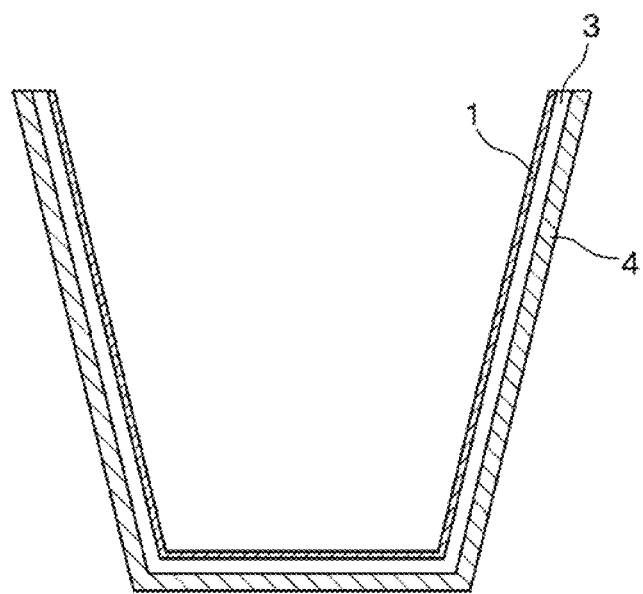

For the outer surface of the paper carton in embodiments of the invention, it can be exposed with paper, or with synthetic resins or synthetic resins containing polar substances can be bonded on it. The synthetic resin (5) can be bonded to the outer surface of the paper carton wholly or partially.

Aluminum lining paper cups and paper cartons are explained by the attached drawings and embodiments. Embodiments of the invention can be embodied in various ways and is not limited to the embodiments described in this specification. The same codes are used for the same or similar elements throughout this specification. "1 to 5" for indicating the scope in this specification means "from 1 to 5 including 1 and 5".

The aluminum lining paper container, the health-friendly and eco-friendly disposable food container in embodiments of the invention is a paper container including aluminum foil in general of which interior is aluminum foil and exterior is a paper or synthetic resins (polar substances can be contained). Synthetic resins can be applied to the surface of the outer layer. In that case, synthetic resins containing polar substances are desirable.

The paper layer in embodiments of the invention means the outer layer including paper. Word of Including or containing means in parts or whole. The synthetic resins in embodiments of the invention have the same meaning as synthetic resin adhesives. As such, biodegradable resins are used as having the same meaning as biodegradable resin adhesives. Biodegradable resins include biodegradable synthetic resins and biodegradable natural resins. Water-based adhesives in embodiments of the invention are used as having the same meaning as water-soluble adhesives.

A paper cup consists of the side paper (side part, side sheet) and the bottom (bottom sheet, bottom plate, bottom). A paper cup may have a lid (on top). For an aluminum lining paper cup, aluminum foil can be placed on the entire inner surface or only on the side part. A paper cup has the same meaning as a paper container. A paper cup can have a top and bottom of which inner diameters are either the same or different.

A paper carton can be used for milk, beer, or other beverages. The top, side, and bottom are generally designed with an all-in-one body. The top or the bottom can be separately connected. The paper container (including paper cup and paper carton) of embodiments of the invention can be used as a container for coffee, instant noodle, fresh noodle or rice, milk, beverages, liquor, food, soup, or stew. The paper container of embodiments of the invention includes the above foods. Food using paper containers can increase the food value by 30% to 100%, as consumers prefer healthy food. Consumers sensitive to health prefer food in paper containers. They are willing to pay 30% to 100% more for it.

The adhesives in embodiments of the invention mean water-soluble adhesives, synthetic resins, polar substances, and synthetic resins containing polar substances. Synthetic resins or synthetic resins containing polar substances in embodiments of the invention have a broad meaning that includes biodegradable resins. The synthetic resins include that of containing polar substances in a broad meaning.

In an embodiment of this invention, the side part of the above paper cup consists of aluminum lining and paper adjacent to the lining, and the outer layer of the above paper is exposed to the atmosphere, or may be bonded with synthetic resins or synthetic resins containing polar substances. The melting point or decomposition point of the adhesives used in embodiments of the invention shall be 100° C. or more. It's more desirable to use it if the softening point is 100° C. or more.

The roll sheets of aluminum foil lining and paper layer are bonded using at least one adhesive among water-soluble adhesive, synthetic resin, or synthetic resin containing polar substances. Making and bonding the side part to a cylindrical shape or shaping and bonding the side paper and the bottom require water-soluble adhesives or synthetic resins containing polar substances. Part 30 in FIG. 9, the jointing area of the side paper and the bottom, doesn't directly contact hot contents, so it can use adhesives of which melting point or decomposition point is lower than 100° C., as the temperature in that area of the cup is about 30° C.-50° C. measured by an infra-red thermometer. Accordingly, the part above can use the adhesives of which melting point or decomposition point is higher than 50° C. or more, depending on the user environment.

An embodiment of this invention is a paper cup with an aluminum thin layer, that interior is aluminum foil lining (1) and exterior is paper or synthetic resin layer. The paper cup that is composed of the side part and the bottom, or having the side part, the top, and the bottom; shaping the side part of the paper container, shaping and bonding the side part and the bottom, or shaping and bonding the side part and the top; shall be shaped and bonded using at least one of water-soluble adhesive or synthetic resin containing polar substances.

An aluminum lining paper carton is made by folding the aluminum lining paper sheet in a rectangular shape and bonding. The whole inner surface of the aluminum lining paper carton material can be used with aluminum foil. In such cases, adhesives are used at the joint of the top and the bottom. Synthetic resins can be exposed on the jointing area of the top and the bottom, and other inner surfaces can be used with aluminum foil. For jointing the side part of the paper carton, it is desirable to use the synthetic resins containing polar substances at the jointing area of the folding paper carton in a rectangular shape. Synthetic resins containing polar substances can be applied to the inner aluminum foil lining or the outer surface of the paper layer.

For shaping and bonding the top and the bottom of the paper carton, synthetic resins or synthetic resins containing polar substances is to be applied, and it is desirable to improve adhesion by using synthetic resins containing polar substances when either of the joints is of aluminum. The adhesives can be applied to the inner side, outer side, or both sides of the paper carton. The melting point or decomposition point of the adhesives can be the service temperature of the container or higher. The melting point or decomposition point of adhesives should be higher than 100° C. or more. It is more recommended that the softening point is 100° C. or more. However, food containers used at room temperature or lower during the entire handling processes, for beer or beverages can use the adhesives of which melting point and decomposition point are 50° C. or more in consideration of the external temperature.

Figure 10:
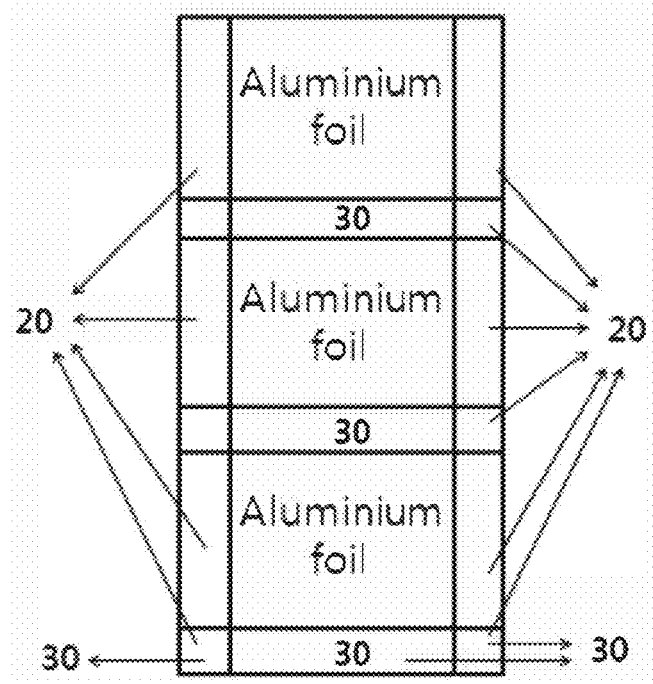
FIG. 10 is one of the embodiments of the drawings of three aluminum lining paper cartons linked to each other in a series in the processes before cutting into each carton. The drawing is centered toward the side part of the paper carton, which can include top and bottom.
Figure 11:
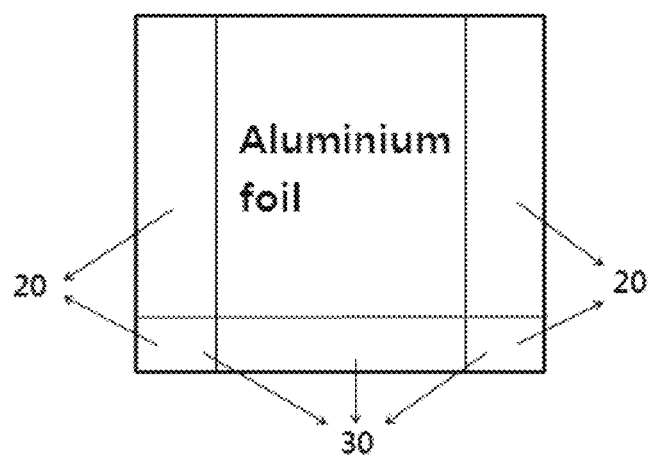
FIG. 11 shows the plan drawing of each paper carton.

For the paper carton of embodiments of the invention, aluminum foil can be lined on the entire inner surface of the paper carton. It facilitates mass manufacturing. Aluminum foil can be bonded to the inner surface of the paper carton except for the joints at the top and bottom (20) as shown in FIGS. 10 and 11. After an aluminum lining is applied, a paper carton is cut and bonded as shown in the embodiment in FIG. 11 to make the paper carton with the required dimension. The individual paper carton material is folded into a paper carton through a molding machine.

The lid for pouring and sealing contents can be attached mainly to the top of paper cartons.

When the aluminum lining is bonded to the entire inner surface, it can be bonded to part 20 or 30 as shown in FIG. 10 and FIG. 11 using the synthetic resins or synthetic resins containing polar substances. The adhesives can be applied to the outer surface. It is more desirable to bond using synthetic resins containing polar substances. When synthetic resins are applied to only one surface out of the inner and outer surface, or no adhesives are used, it is desirable to use the synthetic resins containing polar substances on the opposite side of the bonding surface, in whole or partial.

The aluminum lining paper container of embodiments of the invention uses aluminum foil (1) at least on the inner surface of the side part, and other materials can be used on the outer surface of the side part. However, it is desirable to include the paper on the outer surface of the side part.

One of the embodiments of a manufacturing method of paper containers with an aluminum foil lining in embodiments of the invention provide the manufacturing method of aluminum lining paper cups, which are eco-friendly, health-friendly, and easy to recycle, and are characterized by including the steps below regardless of the order:

Step 1—Removing oil from aluminum foil;

Step 2—Manufacture the aluminum lining paper material by bonding rolled paper and rolled aluminum foil to be layered using water-soluble adhesives, synthetic resins, or synthetic resins containing polar substances whose melting point or decomposition point is 100° C. or more;

Step 3—Roll the aluminum lining paper material made in Step 2 above, and shape the aluminum lining side paper roundly using water-soluble adhesives or synthetic resins containing polar substances whose melting point or decomposition point is 100° C. or more;

Step 4—Tailor the aluminum lining paper material above or the specifically manufactured bottom paper material to make the bottom part and shaping the paper cup by bonding the side paper and the bottom paper using water-soluble adhesives or synthetic resins containing polar substances;

Step 5—Curl the rim of the shaped cup.

Synthetic resins can be bonded on the outer surface of the paper layer in whole or partial. It is more desirable to use synthetic resins containing polar substances.

The manufacturing method of aluminum lining paper cups in another embodiment of this invention is;

Make the side part and this side part and the bottom are jointly bonded making the side part includes bonding the rolled aluminum lining and the rolled paper layer using adhesives. In such a case, synthetic resins can be used on the outer surface of the paper layer.

The above interior aluminum lining and the exterior paper layer are bonded together using the adhesives of which the melting point or decomposition point is 100° C. or more. Use at least one of the water-soluble adhesives, synthetic resins, or synthetic resins containing polar substances.

When shaping and bonding the side part in a cylindrical shape, or shaping the above paper cup by bonding the side part and the bottom uses at least one of the water-soluble adhesives, or synthetic resins containing polar substances.

A paper carton can be an all-in-one type of top, side, and bottom or only side and bottom are an all-in-one type while top part can be combined. An embodiment of manufacturing paper cartons is described below.

Step 1—Bond the aluminum foil on to the entire inner surface of paper material using water-soluble adhesives, synthetic resins, or synthetic resins containing polar substances;

Step 2—Apply synthetic resins or synthetic resins containing polar substances on the joint area (20) of the top and the bottom of the joint;

Step 3—Tailor the paper carton;

Step 4—Apply either one or both parts of the side connection part (30) of the paper carton with synthetic resins or synthetic resins containing polar substances, or to the outer area which is bonded to the side connection part;

Step 5—Attach the lid to the paper carton if necessary;

Step 6—Shape and bond the paper carton.

Embodiments of the invention exhibit the manufacturing method of paper cartons including the steps above regardless of their order.

Another embodiment of manufacturing paper cartons is described below.

Step 1—Apply synthetic resins or synthetic resins containing polar substances on the inner surface of the paper layer;

Step 2—Bond the aluminum foil to the inner surface, except the joint areas at the top and bottom (20) using synthetic resins or synthetic resins containing polar substances;

Step 3—Tailor the paper carton;

Step 4—Apply either one or both parts of the side connection part (30) of the paper carton with synthetic resins or synthetic resins containing polar substances, or to the outer area which is bonded to the side connection part;

Step 5—Attach a lid to the paper carton if necessary;

Step 6—Shape and form the paper carton.

Embodiments of the invention provide the manufacturing method of paper cartons including the above steps regardless of their order.

The reason why recommended melting point or decomposition point of adhesives applied to the containers for hot food is 100° C. or more is the boiling point of water is 100° C., and the bonded part of the container shall be maintained. In the embodiment of this invention, when 100° C. water was put in an 850 cc paper cup, the temperature on the side joint part went up to around 90° C. and the temperature at the bottom of the paper cup was 30° C.-50° C. In consideration of the 10% adding safety ratio, it is desirable that the melting point or decomposition point of applied adhesives is 100° C. or more. When boiling food using the paper carton of embodiments of the invention, the temperature of the paper carton can reach 100° C.

The description that the melting point or decomposition point of water-soluble adhesives or synthetic resins (including synthetic resins containing polar substances) is 100° C. or more may include not only the case when the melting point or decomposition point of all adhesives is 100° C. or more but also the case when the melting point or decomposition point of any one of the adhesive's ingredient is 100° C. or more. It is desirable that the melting point or decomposition point of all adhesive ingredients is 100° C. or more. It's more recommended that the softening point of all adhesives is 100° C. or more. "Melting point", "decomposition point" and "softening point" can be measured using officially certified testing methods.

Paper container in embodiments of the invention describe both of paper cups and paper cartons.

It is desirable to use an aluminum foil that is of superior airtightness for aluminum lining in embodiments of the invention. While the vacuum-evaporating-deposited aluminum layer can also be used but it is inferior to aluminum foil in terms of characteristics for adhesiveness of the lining and airtightness.

The technologies for embodiments of the invention are described in detail as itemized.

1. Method to block endocrine hormones and carcinogens—embodiments of the invention prevent endocrine hormones and carcinogens from leaching into food by putting aluminum foil on the inner surface of the paper cup.
2. Resource Recycling method—Using water-soluble adhesives facilitates the separation of the paper layer and aluminum lining when putting a paper container in water
3. Method to seal the joint of the aluminum lining—at least one of water-soluble adhesives, synthetic resins, or synthetic resins containing polar substances is applied, in whole or partial, to the bottom (30) of the side paper. For a paper carton, the synthetic resin containing polar substances needs to be applied to at least one part of the joints.
4. Method to reusable, luxurious, and optimized portability. The aluminum lining and synthetic resins on the outer surface make a paper container luxurious and waterproof. Then, a paper container can be used longer because it can be washed and re-used. It's also light, and good to carry.
5. Cost-saving method—A paper container of embodiments of the invention look luxurious even when using recycled paper, so it can save production costs.
6. Method to bind aluminum lining and paper layer—While synthetic resins can be applied to containers to be re-used, it is desirable to use mainly water-soluble adhesives to recycle paper. A drying process may include heating. It's desirable to use water-soluble adhesives which contain no toxic substances.

The containers for re-usage do not focus on recycling. Accordingly, those containers can use synthetic resins. Aluminum linings and paper layers can be bonded using synthetic resins including PE, whose melting point or decomposition point is 100° C. or more, or biodegradable resins including PLA (Poly Lactic Acid) and starch-containing plastics, as well as water-soluble adhesives. Embodiments of the invention usethe word 'synthetic resins' in a broad sense, including general synthetic resins and biodegradable resins.

7. Water-soluble adhesives for forming a container—Since the adhesive for forming a container (cup) requires high adhesion strength, adhesives with strong adhesiveness including polyvinyl acetate (PVAc) or ethylene-vinyl acetate (EVA) are desirable. Since water-soluble adhesive requires drying time, it is necessary to increase solid contents and reduce water contents in the adhesive as much as possible. It is most desirable to apply adhesives directly to the joint of the side paper (20 & 30 in FIG. 9).

When water-soluble adhesives are applied to a container for storing water for a long time, the joint may absorb water and can be separated.

8. Synthetic resin adhesives for forming a paper cup—It is desirable to use the synthetic resins of which melting point or decomposition point is 100° C. or more (including synthetic resins or biodegradable synthetic resins, of which softening point is 100° C. or more is more desirable). It is more desirable to use synthetic resins adhesives containing polar substances of which melting point or decomposition point is 100° C. or more When the service temperature of a container is always 100° C. or less, adhesives that melting or decomposition point is higher than service temperature can be used. At least one of the below methods can be applied to the jointing surfaces of synthetic resins.
   (a) Applying the synthetic resins containing polar substances on the entire outer surface of paper roll materials for the bottom (bottom sheet) and the side part (side paper) (applying melt resins using T-die or attaching the film on one side of paper roll materials).
   (b) Partially apply adhesives on the joints (20, 30) of the side part (side paper) or bottom part (bottom sheet).
   (c) After tailoring, Adhesive is applied to the side jointing area (20) in the side paper. The bottom part's adhesives will be applied to the outer part of the Bottom paper roll materials.
   (d) When applying the synthetic resins to the aluminum lining (30) at the bottom of the side paper, the cup can be foamed only by using the synthetic resins applied to the side paper.
9. Method not to use or to reduce the usage of synthetic resins—Using Water-soluble adhesives can significantly reduce the synthetic resins consumption by 0~10% compared to the existing method.
10. Method to decompose after land-fill—using Biodegradable resins are decomposed better after land-fill
11. Method to re-use paper cups—To facilitate re-use of paper cups, At least Side paper needs to be exposed to the atmosphere. To re-use the container, it is desirable to apply a synthetic resin layer on the outer surface for waterproofing during the washing process.

It is desirable that the melting or decomposition point of the water-soluble adhesives is 100 or more, and higher than the melting temperature of synthetic resins used for foaming a cup is desirable. Water-soluble adhesives may contain at least one or more of polyvinyl alcohol (PVA), polyvinyl acetate(PVAc), ethylene-vinyl acetate(EVA), Hydroxypropyl methylcellulose(HPMC), hydroxypropyl methylcellulose phthalate(HPMCP), glue, Casein, Arabic gum, paste, biodegradable adhesive resin, acrylic emulsion, cellophane, or vegetable starch. The vegetable starch above may include but is not limited to at least one or more of gelatinized starch, dextrin, soluble starch, and oxidized starch. The water-soluble adhesive with appropriate adhesion power, which is not toxic in water-based emulsion status or soluble in water can be also used.

Polyvinyl alcohol is desirable to use as the water-soluble adhesive when bonding aluminum foils and paper sheets to make easily recyclable paper cups. To this end, PVA (Polyvinyl Alcohol) ingredients were examined. By the following thesis investigating the oral toxicity of PVA used as a coating agent for drugs and food; it was found that PVA had almost no toxicity: "Review of the oral toxicity of polyvinyl alcohol (PVA)" Author DeMerlis C. C, Schoneker D. R Academic Journal Food and Chemical Toxicology 2003, Vol 41, No. 3 319p-326p ISSN 0278-6915.

Polyvinyl acetate is used to bond aluminum foil and paper that is used for cigarette packages and as the base for chewing gum wrap. OGONG Co. Ltd. of Korea earned an eco-certificate from the Korean government. The MSDS toxicity data for polyvinyl acetate is presented below:
Polyvinyl Acetate LD50 25000 mg/Kg Rat Water-soluble adhesives can include one or more of the adhesives above, or only one type of product exclusively or a mixture of at least two or more kinds. It is desirable to include at least one of polyvinyl alcohol, polyvinyl acetate, or ethylene-vinyl acetate as water-soluble adhesives.

Ethylene-vinyl acetate (EVA) or polyvinyl acetate (PVAc) has stronger adhesion than PVA.

Any other adhesive substances which are soluble in water may be used as water-soluble adhesives. Water-soluble adhesives can be mixed for application. Starch (gelatinized starch is desirable) or water-soluble adhesives, including PVAc, PVA, or EVA, can be mixed-use for application. As an example, the decomposition point of PVA is 200° C. The melting point of PVAc is 135° C. The melting point of EVA (Ethylene Vinyl Acetate) is 40° C.-110° C. When the overall melting point or decomposition point is 100° C. or more after mixing, the mixture is acceptable to use. The bottom joint area (30) of the side paper of the paper cup is 50° C. or less even when the water of 100° C. is poured inside. Thus, the adhesives whose melting or decomposition point is 50° C. or more can be used for the bottom joints.

Safety and Convenience of the Aluminum Lining

It is desirable to use a thin aluminum foil about 6 μm thick. The thickness is similar to a gum wrapper. The melting point of aluminum is 660° C. Accordingly, it melts in the furnace which is 1000° C. or hotter, and becomes micro-particle ash. Thus, it doesn't leave residual ash in the incinerator. Aluminum of different thicknesses can be also used. When aluminum meets oxygen or water, an aluminum oxide protective film of about 10 nm thick is formed through the process $4Al+3O_2 \rightarrow 2Al_2O_3$. The protective film completely protects metal at pH 4-pH 9 (*Source: "Food Packaging", p69, Bak Mu-Hyeon et. al. Hyeongseol Publishing House). A container with an aluminum foil lining is safe for human health because the food and beverages for which embodiments of the invention is intended have a pH of about 7.

The embodiments for manufacturing paper cups of this invention can be one of the following methods 1 to 9.

1. The aluminum foil and the paper from each roll are bonded using water-soluble adhesives or synthetic resins (including biodegradable resins) when the inner surface of paper and aluminum foil are bonded together. However, it is desirable to apply the heating and drying process when using water-soluble adhesive. Synthetic resins containing polar substances can be also used. In embodiments of the invention, water-soluble adhesive, including starch, whose decomposition point is around 200° C. without a specific melting point is also included in the type of water-soluble adhesives whose melting point or decomposition point is 100° C. or more.

2. When using cellophane film between the aluminum lining and the paper layer, the cellophane film with a dampproof function on one side is selected. The dampproof side of the cellophane film is bonded to the aluminum lining or the synthetic resin layer shall be placed between the aluminum foil lining and the cellophane film.

3. For easy recycling, it is desirable to apply water-soluble adhesives or synthetic resins containing polar substances for adhesion to the joint area of the side paper and the bottom. In this case, it is desirable to apply the adhesives to the joints (20, 30) after tailoring the side paper and the bottom. The synthetic resins (including biodegradable resins) or synthetic resins containing polar substances can be also applied to the aluminum lining (30) on the bottom part of the side paper. It is desirable to apply the synthetic resins containing polar substances to the outer surface of the Bottom when applying synthetic resins to part 30.

4. The bottom (bottom sheet) can use synthetic resins (including biodegradable resins) on the inner surface, like an existing bottom sheet, without using aluminum lining. Synthetic resins of which melting point is 100° C. or more can be applied on the outer surface of the bottom sheet. It is more desirable to apply synthetic resins containing polar substances for the entire outer surface of the bottom sheet. Synthetic resins alone can be used as a bottom without using paper.

5. Synthetic resins, for example, PE, PP as non-polar substances have low adhesion power for shaping and bonding a paper cup adhesive power, but the power can be improved by mixing at least one or more polar adhesives substance. Only polar adhesive substances can be used.

In <Embodiment 1>, PE containing polar substances shows the adhesive power at least 10 times stronger than non-polar LDPE. So, it enables slippery aluminum and paper to bond well together. Thus, it is applied for embodiments of the invention.

In the case of using PE, it is more desirable to use HDPE, MDPE, or LLDPE that have a higher melting and softening point than LDPE which is applied to the conventional paper cup lining for safety at 100° C. high-temperature environment.

Hot melt, of which the melting point is 100° C. or more, can be applied when shaping and bonding a cup. Hot-melt is a kind of synthetic resin that increases adhesion power by physically or chemically mixing and bonding polar substances with synthetic resins. It can be made into a film and used. But in general, it is generally melted into a liquid by heating and then sprayed or applied in a liquid condition. Hot-melt cures instantly after applying. Water-soluble adhesives can be also used.

6. It is desirable to include the polar adhesive substance in synthetic resins for shaping and bonding. Synthetic resins can be partially applied to the aluminum lining or applied to the outer surface of the paper layer, partially or in whole.

7. Shaping and bonding a container is mainly by heat bonding. at least one or more thermal bonding methods can be applied including direct heating, mold heating, air heating, ultrasonic bonding, impulse bonding, high-frequency bonding, or laser bonding. However, like the above hot melt case, it doesn't need a separate heating process if in case heat-melted synthetic resins are applied. Adhesive bonding can also be made by pressure without a heating process.

8. Paper layers for cups can be from existing natural pulp or recycled paper.

9. For double-walled paper cups, like those for instant noodles or rice cup containers, embodiments of the invention is applied only for the inner side with aluminum lining.

Vegetable starch in the water-soluble adhesives is neither melted nor decomposed at 100° C. or less, but is burnt and decomposed at high temperatures. Thus, vegetable starch shall be used for application of the temperature 100° C. or more.

Polar substances can make hydrogen bonds with various kinds of metals' (+) ion contained in aluminum foil and strong adhesion power by increasing the Van Der Waals force, dipole moments between the substances. Accordingly, it can significantly increase the bonding power among aluminum, paper, and synthetic resins when shaping and bonding a container. Non-polar synthetic resins have weak adhesion power because of weaker dispersion forces in Van Der Waals forces. Polar adhesives can be either one of the followings:

1. Epoxy resin series
2. Polyamine series
   (1) Aliphatic polyamine—diethyl triamine, triethylenetetramine, diethyl aminopropylamine, xylene diamine including m-xylene diamine, altered aliphatic polyamine, etc.
   (2) aromatic polyamine—phenylen diamine including meta-phenylenediamine, aminodiphenyl sulfone, etc.
3. Acid anhydride series—maleic anhydride, phthalic anhydride, hexahydrophthalic anhydride, etc.
4. Polyamide series
5. Resol resin series
6. Polysulfide series
7. Acrylic series
8. Phenolic resin series
9. Polyurethane series
10. Silicon series
11. Rubber series
12. Polyamid-imide series
13. Polyimide series
14. Polybenzimidazole series
15. Polyester series
16. Polyvinyl acetate series
17. Polyolefine series
18. Nylon series
19. Urea resins series
20. Aniline resin series
21. Toluenesulfonamide series
22. Isocyanatealkyd series
23. Cyanoacrylate series
24. Polydiphenylether series
25. Polyvinyl acetate series
26. Melamine series Water-soluble adhesives or synthetic resins can be hot-melt adhesives, electrically conductive adhesives, quick-drying glues, or anaerobic adhesives.

The polar adhesives used in embodiments of the invention can be single or two or more kinds of adhesives including the substances listed above, two or more kinds mean at least one of the above materials and can include adhesives that are not listed above.

For an example of the substances which can be used as the polar adhesives as their melting point is 100° C. or more, hot-melt has diverse melting points depending on main ingredients, and the melting point and boiling point of phthalic anhydride are 131.6° C. and 285° C., respectively, and the melting point and boiling point of maleic anhydride are 130° C.-130.5° C. and 138.5° C., respectively, and methyl methacrylate starts thermal transformation at 118-122° C. Several polar substances can be mixed for application.

Polar adhesives of which melting point is 100° C. or more can be used alone or mixed. They can be mixed with PE (HDPE, MDPE, LDPE, LLDPE, etc.), PP, polyester, nylon, PS, PET, biodegradable synthetic resins, or PLA(polylactic acid), biodegradable resins.

The synthetic resins containing polar substances above can include at least one kind or more of synthetic resins among polyethylene (at least one kind or more in high-density polyethylene, mid-density polyethylene, low-density polyethylene, or ultra-low-density polyethylene), polyolefine group, including polypropylene, etc, polyester group, including polyethylene terephthalate, etc, nylon group, and polystyrene group.

The adhesive layer can be formed in a single or two or more.

The bottom shape of a paper container can include but are not limited to the shape of circles, N-polygons including rectangles, or amorphous shape.

The adhesion power of adhesives can be simply checked by three kinds of peeling tests after bonding as follow:

1. Peel of bonding surface (interfacial peel);
2. Peel by adhesive fracture;
3. Peel by fractures of the adhered material (no peel on adhesive itself or bonding surface).

The strongest binding is demonstrated by the above #3 test. The adhesives for shaping and bonding a container should satisfy the above #3 test.

<Embodiment 1> Adhesion Power Test of Adhesives (Bonding Aluminum and Paper)

The adhesion power test for aluminum foil and paper was implemented with diverse kinds of adhesives The adhesion power was measured by the force per cm of the bonding width, which started to be peeled off when the tensile force was applied vertically. The results are shown in Table 1.

TABLE 1

| Description | Type | Bonding Strength (g/cm) | Test Results | Adhesive Power |
|---|---|---|---|---|
| Water-soluble Adhesives | Gelatinized Rice Starch | 50~75 | Interfacial peeling (bonding surface peel) | Weak |
| | Sweet Rice Starch | 50 | Interfacial peeling (bonding surface peel) | Weak |
| | PVA | 100 or more | Partial destruction of the adherend (Partial destruction of | Good |

TABLE 1-continued

| Description | Type | Bonding Strength (g/cm) | Test Results | Adhesive Power |
|---|---|---|---|---|
| | PVAc | 200~400 | paper and interfacial peeling both occurs) Adherend (paper) destruction & interfacial peeling | Good |
| | EVA | 200~400 | Adherend (paper) destruction & interfacial peeling | Good |
| Synthetic Resins | LDPE | 100 | 1. The adherend (paper) partial destruction peeling 2. Interfacial peeling on the aluminum foil surface | Weak |
| Synthetic Resins + Adhesives containing Polar Adhesive Substances | LLDPE + Polar Adhesive Substances | 1,000 or more | Adherend paper destruction | Very good |
| | HDPE + Polar Adhesive Substances | 1,000 or more | Adherend paper destruction | Very good |
| | PP + Polar Adhesives substance | 1,000 or more | Adherend paper destruction | Very good |

[Table 1]

※ Water-soluble adhesives can be mixed with each other for application besides the above embodiments.

<Embodiment 2> Table 2 Presents Peeling-Off Time in Cold Water (20° C.) after Bonding the Aluminum and the Paper Layer Using Adhesives

TABLE 2

| Description | Type | Peeling Time | Remarks |
|---|---|---|---|
| Water-soluble Adhesives | Gelatinized Rice Starch | 5-10 Min. | |
| | Sweet Rice Starch | 15-20 Min. | |
| | PVA | 10-15 Min. | |
| | PVAc | 3-4 Hours | White residue remained on the surface of the adherend after being peeled off. |
| | EVA | 12-24 Hours | White residue remained on the surface of the adherend after being peeled off. |
| | EVA + PVAC | 10-12 Hours | White residue remained on the surface of the adherend after being peeled off. |
| Synthetic Resins Adhesives | PE | 3-4 days and longer | PE film could be forcibly peeled off by hands even after 3-4 days in the water. |

Embodiment 3

The paper material layer and aluminum lining material are bonded using water-soluble adhesives. The joints for shaping and boning a cup use synthetic resins containing polar substances. The outer paper surface of the cup is exposed to the atmosphere.
1. Bond paper material layer and aluminum lining material using water-soluble adhesives.
2. Tailor the side paper and the bottom sheet.
3. Applying the synthetic resins containing polar adhesives to the joint of the side paper.
4. Shape and bond the side paper in a round shape.
5. Shape and bond the cup by joining the bottom sheet to the side paper.

Embodiment 4

The paper material layer and aluminum lining material are bonded using water-soluble adhesives. The joint areas for shaping and bonding a paper cup are also bonded using water-soluble adhesives. The outer paper surface of the cup is exposed to the atmosphere.
1. Bond paper material layer and aluminum lining material using water-soluble adhesives.
2. Tailor the side paper and the bottom sheet.
3. Water-soluble adhesives are applied to the joint of side paper.
4. Shape and bond the side paper in a round shape.
5. Shape and bond the cup by jointing the bottom sheet to the side paper.

Embodiment 5

Figure 2:
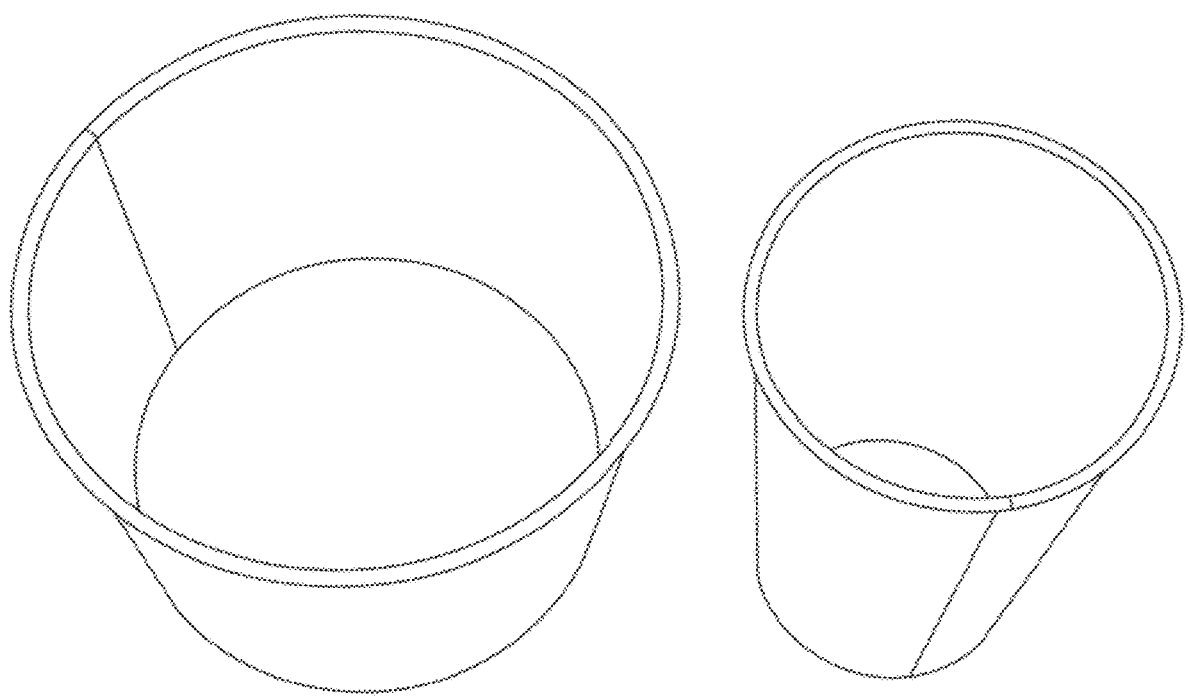
FIG. 2 is an 850 cc aluminum lining paper container sample photo for food and a 13 oz. aluminum lining paper cup sample photo for beverages.
Figure 3:
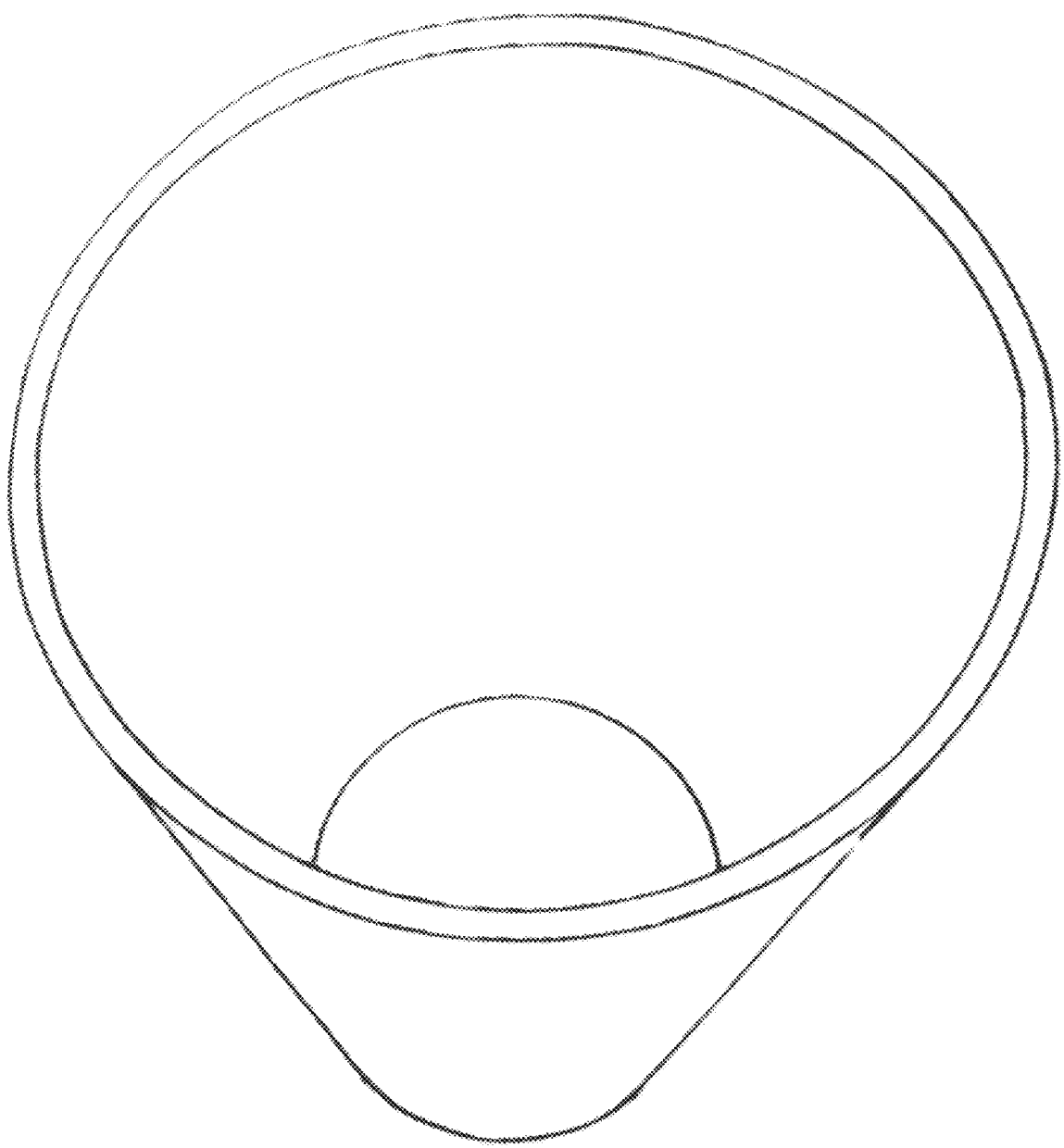
FIG. 3 is 13 oz. (≈368 cc) aluminum lining paper cup sample photo for beverages (coffee cup).
Figure 4:
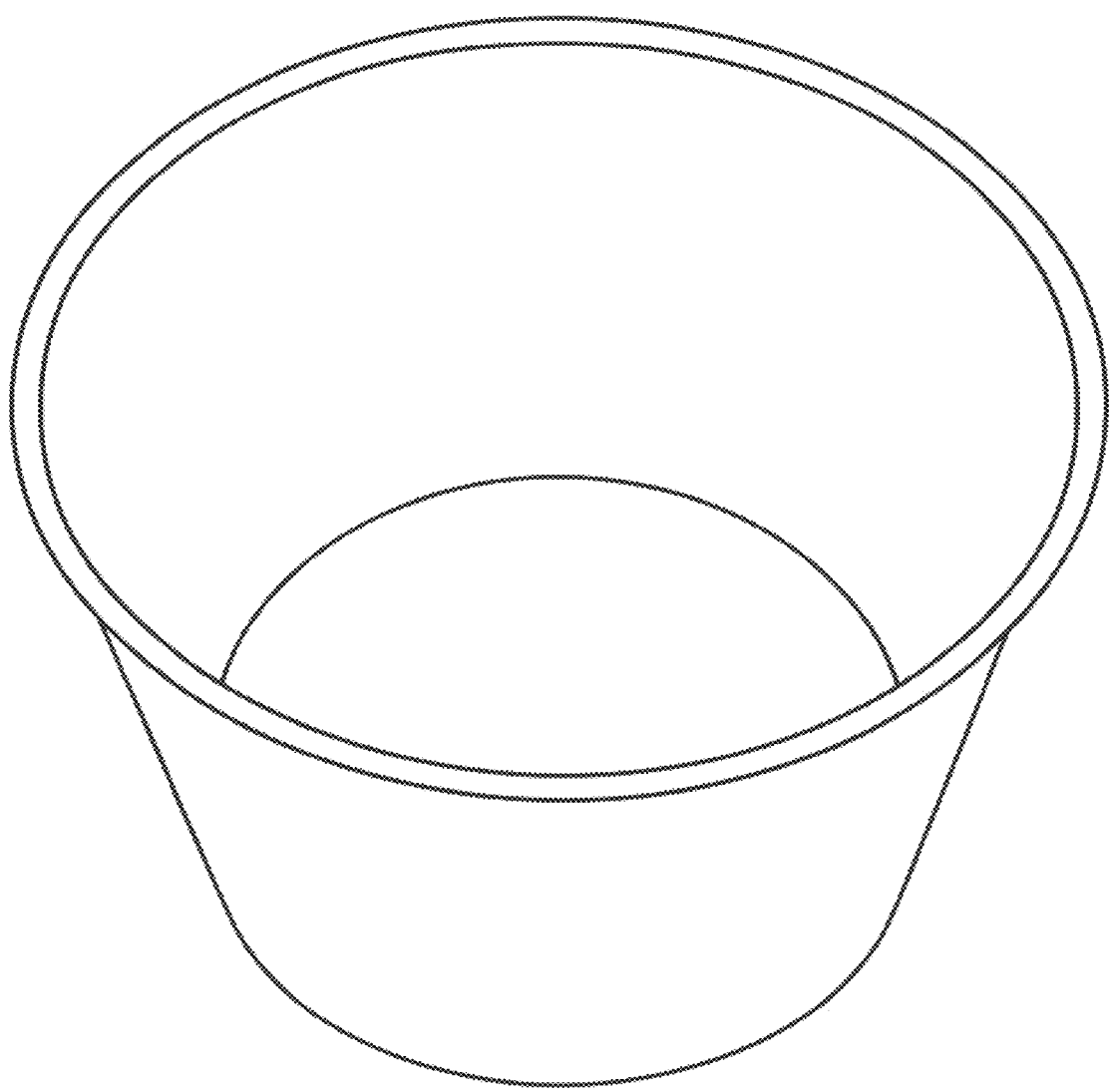
FIG. 4 is an 850 cc aluminum lining paper cup sample photo.

As shown in FIGS. 2 to 4, the paper material layer and aluminum lining material are bonded together using synthetic resins. Synthetic resins containing polar adhesives of which melting point is 100° C. or more are applied to one side of the paper layer.
1. Bond one side of the paper material layer to aluminum lining material using synthetic resins (LDPE).
2. Synthetic resins, of which melting and softening point are 100° C. or more and contain polar adhesives of which melting or decomposition point is 100° C. or more, are applied to the other side of the paper layer.
3. Tailor the side paper and the bottom sheet.
4. Shape and bond the side paper in a round shape.
5. Shape and bond the cup by jointing the bottom sheet to the side paper.

Embodiment 6

The paper material layer and aluminum lining material are bonded together using synthetic resins. The synthetic resins containing polar substances are applied to the joint area for shaping and bonding a cup. The outer paper surface of a cup is exposed to the atmosphere.

1. The aluminum lining material is bonded to one side of the paper material layer using synthetic resins.
2. Tailor the side paper and the bottom sheet.
3. Synthetic resins containing polar substances for adhesion are applied to the joint area (20, 30) of the side paper.
4. Shape and bond the side paper in a round shape.
5. Shape and bond the cup by jointing the bottom sheet to the side paper.

DETAILED DESCRIPTION

Figure 5:
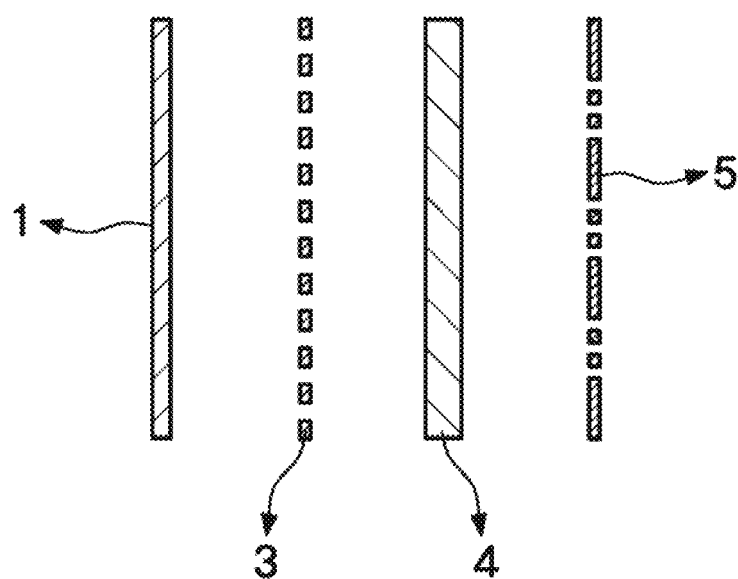
FIG. 5 is a part of the cross-section of the embodiment applying the water-soluble bonding layer (3) between the aluminum foil lining (1) and the outer paper layer (4)

FIG. 1 is the overall sectional drawing focusing on the side section of a paper cup with the aluminum lining. The inner surface is aluminum foil (1) and the outer surface is paper (4). The paper layer and aluminum lining are bonded using water-soluble adhesives (3). The synthetic resin layer (polar substances or biodegradable resins can be contained) can be applied to the outer surface of the paper layer. However, synthetic resins containing polar substances are more desirable. The outer synthetic resin layer can be used with foamed synthetic resins (synthetic resins foamed by air bubbles);

FIG. 5 is a part of the cross-section of the embodiment placing the water-soluble adhesive layer (3) between the aluminum lining (1) and the paper layer (4). Synthetic resins (5) can be bonded to the outer surface of the paper layer. The synthetic resins on the outer surface of the paper layer can be applied partially or in whole.

Figure 6:
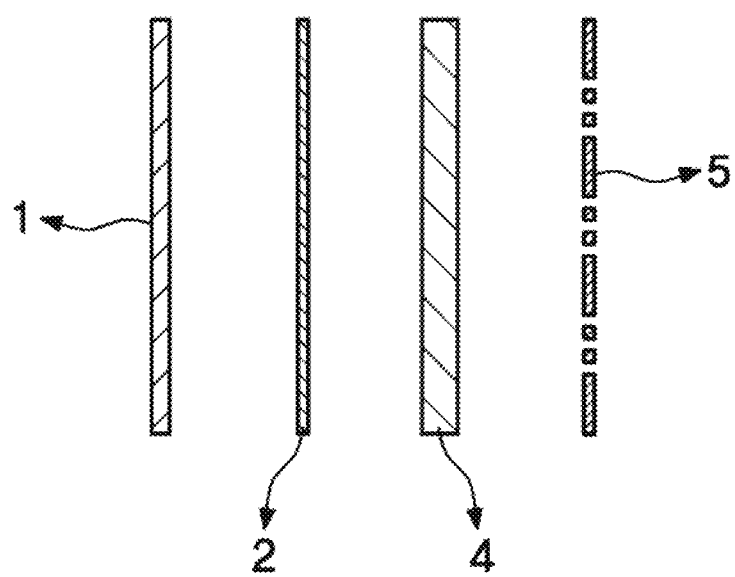
FIG. 6 is a part of the cross-section of the embodiment placing the synthetic resin bonding layer (2) between the aluminum foil lining (1) and the paper layer (4)
Figure 7:
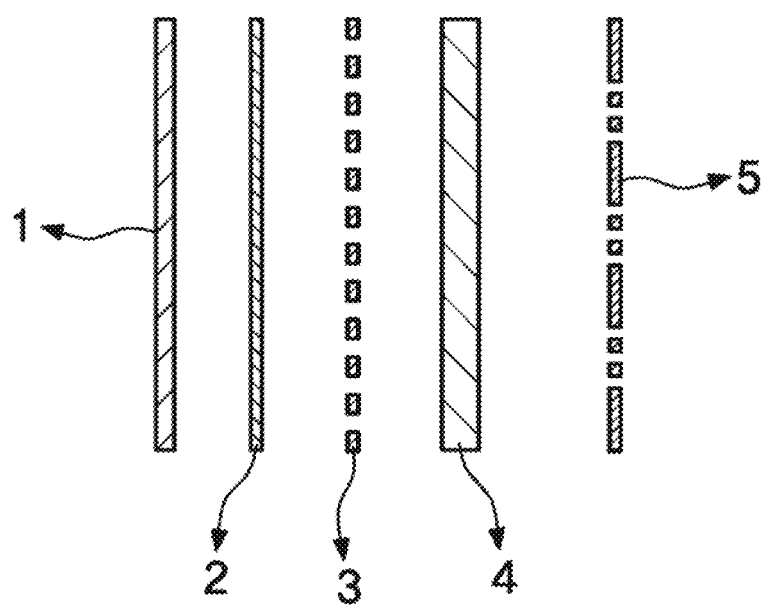
FIG. 7 is a part of the cross-section of the embodiment applying the synthetic resin bonding layer (2) and water-soluble bonding layer (3) between the aluminum foil lining (1) and the outer paper layer (4)
Figure 8:
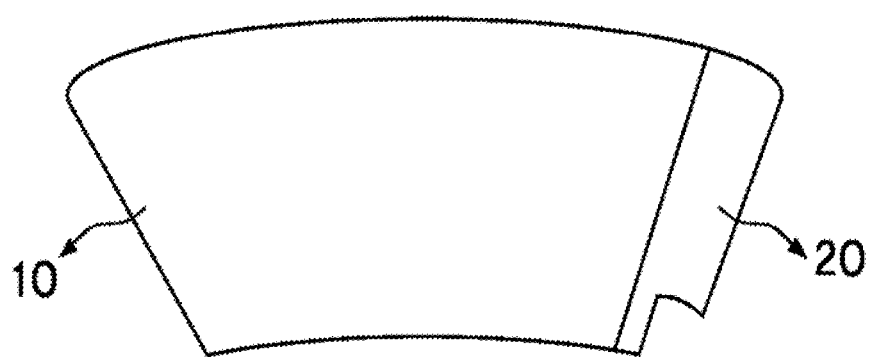
FIG. 8 is the embodiment of locally placing synthetic resin containing polar substances or water-soluble adhesives for shaping the container on the side (20) of the side paper (side part) (10) of the paper cup.
Figure 9:
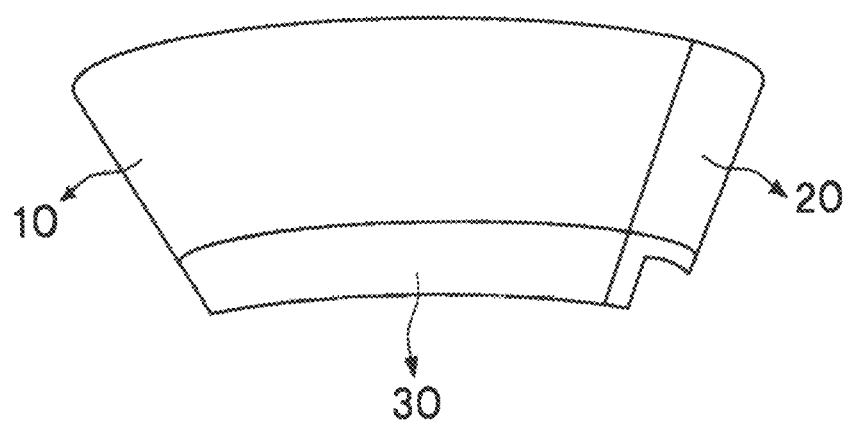
FIG. 9 is the embodiment placing the adhesives on the side (20) and bottom (30) of the side paper. The paper cup can be made in a fan shape, or in a cylindrical shape that the diameters of the top and the bottom are the same.

FIG. 6 is a part of the cross-section of the embodiment placing the synthetic resin adhesive layer (2) between the aluminum lining (1) and the paper layer (4). Synthetic resins (5) can be bonded to the outer surface of the paper layer. The synthetic resins on the outer surface of the paper layer can be applied partially or in whole;

FIG. 7 is a part of the cross-section in the embodiment placing the synthetic resin adhesive layer (2) and water-soluble bonding layer (3) between the aluminum lining (1) and the paper layer (4). Synthetic resins (5) can be applied to the outer surface of the paper layer. The synthetic resins on the outer surface of the paper layer can be applied partially or in whole;

FIG. 8 is the embodiment placing synthetic resins containing polar substances or water-soluble adhesives for shaping and bonding the container on the side (20) of the side paper (side part) (10). When non-polar synthetic resins are applied to the inner surface, it is desirable to improve adhesion by using those containing the polar substances on the outer surface to be bonded to the corresponding inner surface and vice versa;

FIG. 9 is the embodiment applying synthetic resins or synthetic resins containing polar substances or water-soluble adhesives to the side (20) of side part (side paper) and synthetic resins containing polar substances, non-polar synthetic resins, or water-soluble adhesives to the aluminum lining of the bottom part (30) of side part (side paper) (10). The shape of a paper cup in FIG. 9 can be a fan shape, trapezoid shape, or any shape with the same diameters on the top and the bottom. When applying non-polar synthetic resins, it is desirable to apply synthetic resins containing polar substances of which melting point is 100° C. or more to the outer surface of the side part (side paper) or bottom sheet (bottom plate, bottom). When applying adhesives to the bottom part (30) of the side paper, adhesives are applied to a broader width than the height of the surrounding supporter of the Bottom sheet like a part 30 in FIG. 9. The adhesives are applied partially or in whole, to part 30 to prevent adhesives from being exposed to the inside of the paper cup. In such a case, even if the inner side of the bottom is an aluminum foil lining, the jointing parts of side paper and bottom form double jointing layers as inner jointing and outer jointing. So the paper cup can be completely sealed. In this case, even when the paper is exposed to the outer surface of the bottom sheet, strong sealing is secured. This design is favorable for paper recycling;

FIG. 10 is the drawing of three aluminum lining paper cartons linked with each other in a series of processes before tailoring each paper carton. An aluminum foil lining is bonded to the paper with synthetic resins in the direction of the paper roll. When tailoring each paper carton, part 20 on both sides, which is the joint area of the top and the bottom of the paper carton, or the joint at the top which is separately assembled. Part 20 is the bonding part of the paper carton where synthetic resins or synthetic resins containing polar substances are applied. This section drawing is applied to both the all-in-one type of top, side, and bottom part or that of side part and bottom only; and FIG. 11 shows the section drawing on each paper carton individually tailored image in FIG. 10 above. A lid or a cap can be attached to the top. Synthetic resins or synthetic resins containing polar substances are applied to seal joints of the top and the bottom. Part 30 is the side joint with the aluminum lining. It is desirable to use synthetic resins containing polar substances for securely shaping and bonding a carton.

As shown in FIGS. 2 to 4, the aluminum lining paper cup sample was made for the first time in the world. The sample was produced in an existing paper cup manufacturing plant, which demonstrates the cup-can be mass-produced for commercial purposes with existing facilities. Embodiments of the invention were planned and designed to manufacture goods using the existing facilities as much as possible. The cost increase is negligible. Consumers have been waiting for disposable food containers, which can be used without any worries on endocrine disrupters for dozens of years. Accordingly, embodiments of the invention can be used for commercial purposes.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A paper cup having an aluminum lining layer, the paper cup comprising:
    a side part and a bottom part, wherein the side part includes an inner aluminum thin layer and a paper material layer and the bottom part includes an inner aluminum thin layer and a paper material layer;
    wherein adhesives are placed partially or in whole to joints between the side part and the bottom part comprising a first joint part between the inner aluminum thin layer of the side part and the inner aluminum thin layer of the bottom part and a second joint part between the inner aluminum thin layer of the side part and an outer part of the bottom part, to join the side part and the bottom part;

wherein the adhesives are applied to a lower portion of the side part with a greater width than a height of the bottom part;
wherein the first joint part and the second joint part forms a bond along both inner and outer overlapping regions where the side part and the bottom part meet;
wherein the paper cup is a health-safe and eco-friendly reusable aluminum lining paper cup.

2. The aluminum lining paper cup according to claim 1, wherein the aluminum lining paper cup is formed by joining the side part and the bottom part.

* * * * *